| (12) | United States Patent | (10) Patent No.: | US 10,135,313 B2 |
|---|---|---|---|
| | Jang et al. | (45) Date of Patent: | Nov. 20, 2018 |

(54) STATOR OF MOTOR FOR WASHING MACHINE

(71) Applicant: NEW MOTECH CO., LTD., Gwangju (KR)

(72) Inventors: Jeong Cheol Jang, Gwangju (KR); Ji Min Lee, Gwangju (KR); Gyeong Sik Yang, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 179 days.

(21) Appl. No.: 15/114,846

(22) PCT Filed: Jun. 17, 2014

(86) PCT No.: PCT/KR2014/005285
§ 371 (c)(1),
(2) Date: Jul. 28, 2016

(87) PCT Pub. No.: WO2015/152463
PCT Pub. Date: Oct. 8, 2015

(65) Prior Publication Data
US 2016/0344254 A1      Nov. 24, 2016

(30) Foreign Application Priority Data

Apr. 1, 2014   (KR) .................. 10-2014-0038576

(51) Int. Cl.
*H02K 5/24*        (2006.01)
*H02K 1/14*        (2006.01)
(Continued)

(52) U.S. Cl.
CPC ................ *H02K 5/24* (2013.01); *H02K 1/04* (2013.01); *H02K 1/146* (2013.01); *H02K 1/187* (2013.01); *H02K 7/14* (2013.01)

(58) Field of Classification Search
CPC .......... H02K 1/187; H02K 1/04; H02K 1/146; H02K 5/24; H02K 7/14
(Continued)

(56) References Cited

U.S. PATENT DOCUMENTS

| 7,262,540 B2 | 8/2007 | Lee |
|---|---|---|
| 7,271,512 B2 | 9/2007 | Lee et al. |

(Continued)

FOREIGN PATENT DOCUMENTS

| KR | 10-2006-0105995 A | 10/2006 |
|---|---|---|
| KR | 10-1033574 B1 | 5/2011 |

OTHER PUBLICATIONS

International Search Report for PCT/KR2014/005285 dated Jan. 2, 2015 from Korean Intellectual Property Office.

*Primary Examiner* — Alex W Mok
(74) *Attorney, Agent, or Firm* — Revolution IP, PLLC

(57) ABSTRACT

Disclosed is a stator of a motor for a washing machine including: a stator core manufactured by a plurality of steel sheets laminated on top of each other, the stator core having a core base and a plurality of teeth radially formed on the core base; an upper insulator which covers the upper parts of the core base and the teeth to insulate them, the upper insulator having least three upper fastening parts which are formed therein and each of which has an upper fastening hole; and a lower insulator which covers the lower parts of the core base and the teeth to insulate them, the upper insulator having least three upper fastening parts which are formed therein and each of which has a lower fastening hole.

4 Claims, 4 Drawing Sheets

(51) Int. Cl.
*H02K 1/18* (2006.01)
*H02K 1/04* (2006.01)
*H02K 7/14* (2006.01)

(58) Field of Classification Search
USPC ..................................................... 310/254.1
See application file for complete search history.

(56) References Cited

U.S. PATENT DOCUMENTS

| | | | |
|---|---|---|---|
| 7,336,014 B2 | 2/2008 | Lee | |
| 7,362,028 B2 | 4/2008 | Lee | |
| 8,405,268 B2* | 3/2013 | Bailey | H02K 1/187 310/43 |
| 8,415,853 B2* | 4/2013 | Jang | H02K 3/522 310/214 |
| 8,450,898 B2* | 5/2013 | Sears | H02K 3/522 310/194 |
| 8,598,764 B2* | 12/2013 | Horng | H02K 3/34 310/194 |
| 2004/0163428 A1* | 8/2004 | Kim | D06F 37/206 68/140 |
| 2009/0230812 A1* | 9/2009 | Cho | H02K 1/187 310/216.118 |
| 2011/0036127 A1 | 2/2011 | Lee | |
| 2012/0085519 A1* | 4/2012 | Chou | F28D 15/0275 165/104.26 |
| 2013/0106237 A1* | 5/2013 | Jang | H02K 3/325 310/254.1 |

* cited by examiner

[Fig. 1]
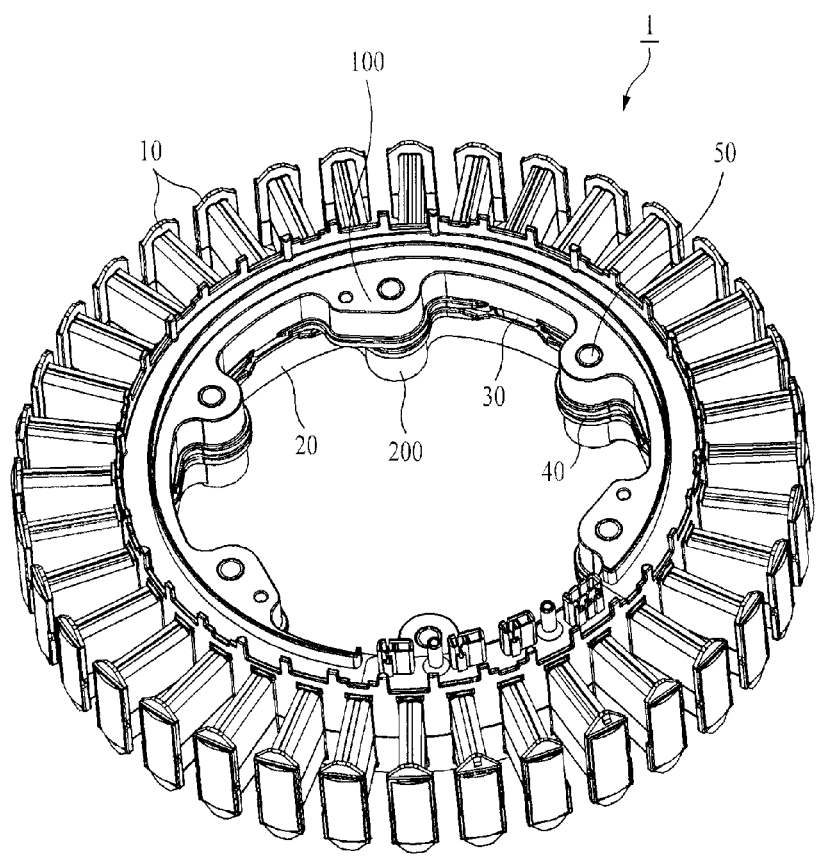

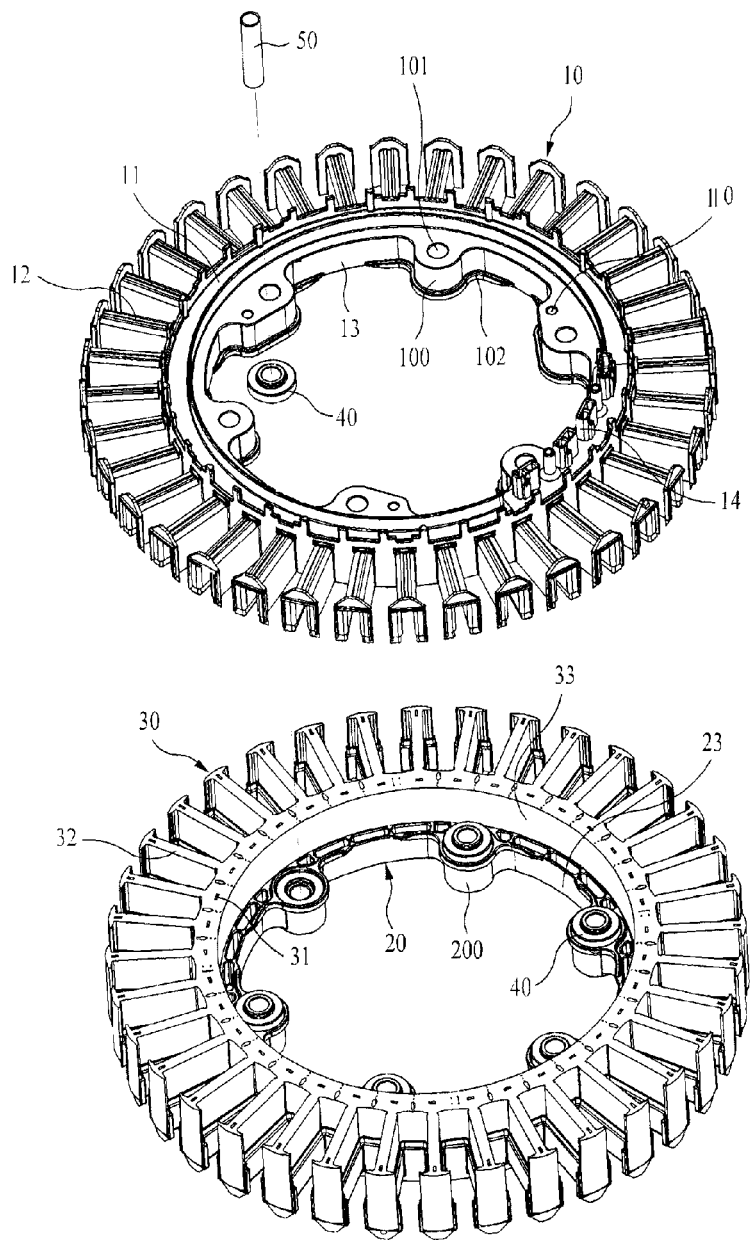
[Fig. 2]

[Fig. 3]
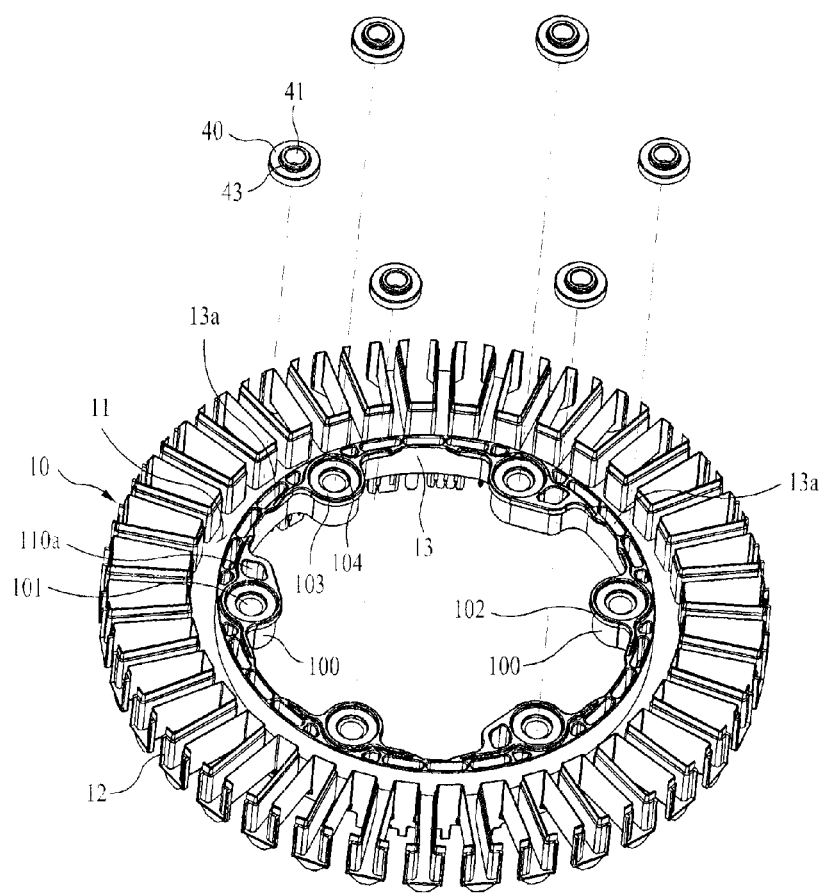

[Fig. 4]
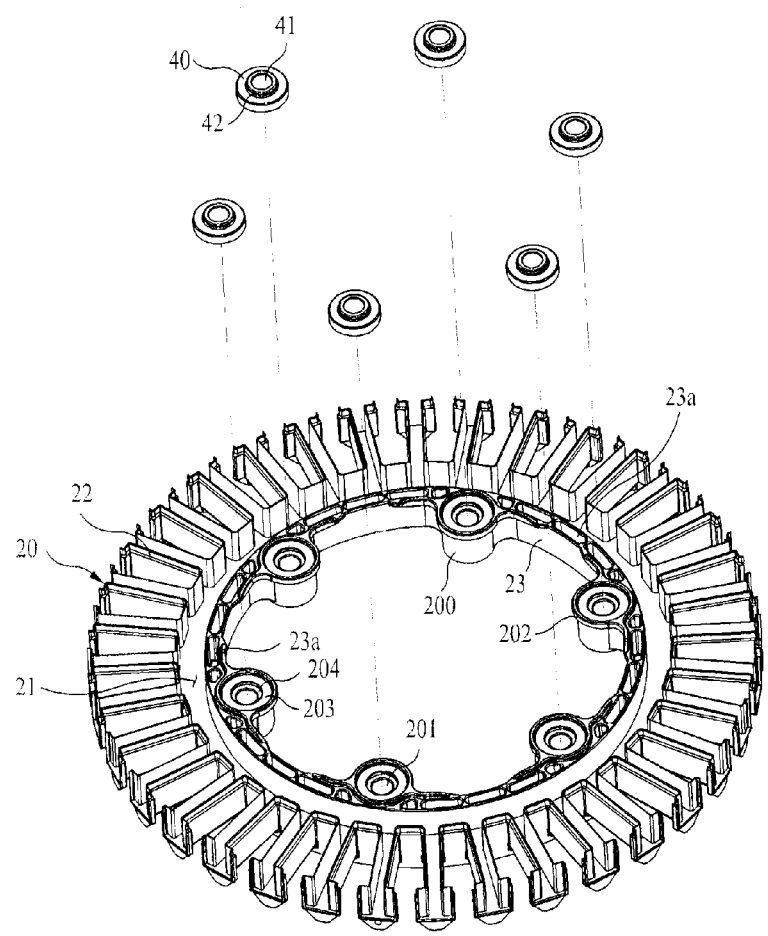

STATOR OF MOTOR FOR WASHING MACHINE

CROSS REFERENCE TO PRIOR APPLICATIONS

This application is a National Stage Application of PCT International Patent Application No. PCT/KR2014/005285 filed on Jun. 17, 2014, under 35 U.S.C. § 371, which claims priority to Korean Patent Application No. 10-2014-0038576 filed on Apr. 1, 2014, which are all hereby incorporated by reference in their entirety.

TECHNICAL FIELD

The present invention relates to a stator of a motor for a washing machine, and more particularly, to a stator of a motor for a washing machine which can prevent noise and vibration while operating and reduce manufacturing costs.

BACKGROUND ART

In general, a motor for a washing machine includes a rotor and a stator. The stator includes a stator core in which a number of steel sheets are laminated on top of each other and an insulator surrounding the stator core. Such a structure of the stator is disclosed in U.S. Pat. Nos. 7,336,014 and 7,362,028 and U.S. Patent Publication No. 2011/0036127.

In U.S. Pat. No. 7,336,014, the stator has a structure that an upper insulator and a lower insulator which come in contact with each other and surround nearly all of the inner circumferential surface of a stator core. Such a structure may generate noise by a fine vibration near the boundary of the two insulators when a motor is operated, and require relatively lots of resin molding because the insulators cover most of the inner circumference of the stator core.

In U.S. Pat. No. 7,362,028, because a fastening part is formed by the upper insulator and the lower insulator which come into contact with each other, the problems of vibration, noise and increase of manufacturing costs are not solved. Moreover, one or more fastening projections protrude inwardly from a hole of the connected part, but in this instance, the fastening projection is cut out by a sleeve when the sleeve is forcedly pressed, and hence, it generates foreign matters.

In U.S. Patent Publication No. 2011/0036127, a fastening part is formed only at the upper insulator and is not formed at the lower insulator, but such a structure is weak in fastening strength because only one insulator is fastened to the stator core. Furthermore, such a structure also does not solve the problems of the fine vibration and noise.

Therefore, in order to solve the above problems, the inventors of the present invention propose a new structure of a stator of a motor for a washing machine.

DISCLOSURE OF INVENTION

Technical Problem

Accordingly, the present invention has been made in an effort to solve the above-mentioned problems occurring in the prior arts, and it is an object of the present invention to provide a stator of a motor for a washing machine which can prevent noise and vibration while operating Another object of the present invention is to provide a stator of a motor for a washing machine which can reduce manufacturing costs.

The above and other objects, features and advantages of the present invention will be apparent from the following detailed description of the preferred embodiment of the invention in conjunction with the accompanying drawings.

Solution to Problem

To achieve the above objects, the present invention provides a stator of a motor for a washing machine including: a stator core manufactured by a plurality of steel sheets laminated on top of each other, the stator core having a core base and a plurality of teeth radially formed on the core base; an upper insulator which covers the upper parts of the core base and the teeth to insulate them, the upper insulator having least three upper fastening parts which are formed therein and each of which has an upper fastening hole; and a lower insulator which covers the lower parts of the core base and the teeth to insulate them, the upper insulator having least three upper fastening parts which are formed therein and each of which has a lower fastening hole, wherein a predetermined space is formed between the inner circumferential surface of the upper insulator and the inner circumferential surface of the lower insulator, and the inner circumferential surface of the core base is exposed through the space.

In the embodiment of the present invention, the stator further includes a damper which is joined between the upper fastening part and the lower fastening part and which has a central hole, wherein the upper fastening hole, the lower fastening hole and the central hole are formed at positions corresponding to one another.

In the embodiment of the present invention, an upper damper seating part which has an upper damper insertion hole is formed inside the upper fastening hole, a lower damper seating part which has a lower damper insertion hole is formed inside the lower fastening hole, an upper protrusion part formed at the upper part of the damper is inserted into the upper damper insertion hole, and a lower protrusion part formed at the lower part of the damper is inserted into the lower damper insertion hole.

In the embodiment of the present invention, the stator further includes a bush which is fastened to the upper fastening hole, the central hole and the lower fastening hole.

In the embodiment of the present invention, an upper strength reinforcing part 102 is formed around the upper fastening part 100, and a lower strength reinforcing part 202 is formed around the lower fastening part 200.

Advantageous Effects of Invention

The stator of the motor for the washing machine according to the embodiment of the present invention can prevent noise and vibration while operating and reduce manufacturing costs.

BRIEF DESCRIPTION OF DRAWINGS

FIG. 1 is a perspective view showing a stator of a motor for a washing machine according to a preferred embodiment of the present invention.

FIG. 2 is an exploded perspective view showing a part of the stator of the motor for the washing machine according to the preferred embodiment of the present invention.

FIG. 3 is a bottom side perspective view of an upper insulator used in the stator of the motor for the washing machine.

FIG. 4 is a top side perspective view of a lower insulator used in the stator of the motor for the washing machine.

Reference will be now made in detail to the preferred embodiment of the present invention with reference to the attached drawings.

MODE FOR THE INVENTION

FIG. 1 is a perspective view showing a stator 1 of a motor for a washing machine according to a preferred embodiment of the present invention.

As shown in FIG. 1, the stator 1 of the motor for the washing machine according to the preferred embodiment of the present invention includes an upper insulator 10, a lower insulator 20 and a stator core 30.

The stator core 30 is manufactured by a plurality of steel sheets laminated on top of each other, and the upper part and the lower part of the stator core 30 is insulated by the upper insulator 10 and the lower insulator 20. When the upper insulator 10 and the lower insulator 20 are joined to the upper part and the lower part of the stator core 30, the inner circumferential surface of the upper insulator 10 and the inner circumferential surface of the lower insulator 20 do not come into contact with each other but are spaced apart from each other at a predetermined interval. The stator core 30 is exposed through the interval to be visible to the naked eyes.

At least three upper fastening parts 100 and at least three lower fastening parts 200 are respectively formed on the inner circumferences of the upper insulator 10 and the lower insulator 20. The upper fastening part 100 and the lower fastening part 200 are opposed to each other and respectively have holes, such that one bush 50 penetrates the holes of the two fastening parts 100 and 200. Dampers 40 may be selectively joined to the upper fastening part 100 and the lower fastening part 200. A bolt (not shown) penetrates through the inside of the bush 50, so that the stator 1 is fastened to a motor set (not shown).

FIG. 2 is an exploded perspective view showing a part of the stator of the motor for the washing machine according to the preferred embodiment of the present invention.

Referring to FIG. 2, the upper insulator 10 of the stator 1 of the motor according to the preferred embodiment of the present invention is fastened to the upper part of the stator core 30, and the lower insulator 20 is fastened to the lower part of the stator core 30.

The stator core 30 includes a rounded core base 31, and a plurality of teeth 32 radially formed around the rounded core base 31. A core inner circumferential surface 33 is located on the inner face of the core base 31.

Because the upper insulator 10 covers the upper part of the stator core 30, the upper insulator 10 includes an upper base cover part 11 for covering the upper part of the core base 31, an upper teeth cover part 12 for covering the upper part of the teeth 32, and an upper inner circumference cover part 13 for covering the inner circumference 33. The upper fastening parts 100 which are located at predetermined positions of the upper inner circumference cover part 13 protrude inwardly. A tap terminal 14 to be connected with an external power supply is formed at a predetermined position of the upper base cover part 11.

An upper fastening hole 101 for inserting the bush 50 is formed in the upper fastening part 100. A damper 40 may be joined to the inner face of the upper fastening part 100. An upper strength reinforcing part 102 may be formed at the lower part of the upper fastening part 100 in order to reinforce strength of a protruding part. Moreover, an aligning hole 110 for taking a correct position when the stator 1 is fastened to the motor set may be formed at one side of the upper fastening hole 101 of the upper fastening part 100.

FIG. 3 is a bottom side perspective view of an upper insulator used in the stator of the motor for the washing machine.

As shown in FIG. 3, the upper insulator 10 according to the preferred embodiment of the present invention includes the upper base cover part 11 which covers the core base 31 of the stator core 30 and the upper teeth cover part 12 which covers the teeth 32. The inner circumferential surface of the upper insulator 10 forms the inner circumference cover part 13, and at least three upper fastening part 100 which are formed at predetermined positions are formed on the upper inner circumference cover part 13. A damper seating part 103 to which the damper 40 is connected may be formed around the upper fastening hole 101. The upper damper seating part 103 has an upper damper insertion hole 104, and the damper 40 is connected when an upper protrusion part 42 of the damper 40 is inserted into the upper damper insertion hole 104. A central hole 41 of the damper 40 has the same size as the upper fastening hole 101 and is formed at the same position, such that the bush 50 can penetrate the upper fastening hole 101 and the central hole 41.

In case that the aligning hole 110 is formed in the upper fastening part 100, a plurality of empty spaces 13a are formed around the aligning hole 110 to thereby reduce an amount of resin molding. Moreover, the empty spaces 13a which are formed inside the upper inner circumference cover part 13 can reduce manufacturing costs by reducing the amount of resin molding.

The damper 40 is made of a material which can absorb shock and vibration, such as rubber, in order to provide a buffer action and vibration-proof function, but it is not restricted to rubber, and various materials, such as silicon, aluminum die casting, plastic or metal, may be applied as occasion demands. The damper 40 has the central hole 41 through which the bush 50 penetrates, and the upper protrusion part 42 and the lower protrusion part 43 are respectively formed at the upper part and the lower part of the central hole 41. The upper protrusion part 42 is located in the upper damper insertion hole 104 formed inside the upper fastening part 100 and around the upper fastening hole 101 when the damper 40 is fastened to the upper and lower fastening parts 100 and 200.

FIG. 4 is a top side perspective view of a lower insulator used in the stator of the motor for the washing machine.

As shown in FIG. 4, the lower insulator 20 includes a lower base cover part 21 which is a part to cover the core base 31 of the stator core 30 and a lower teeth cover part 22 which is a part to cover the lower part of the teeth 32. The inner circumference of the lower insulator 20 forms the lower inner circumference cover part 23, at least three lower fastening parts 200 which are formed at predetermined positions are formed on the lower inner circumference cover part 23.

Each of the lower fastening parts 200 has a lower fastening hole 201. A lower damper seating hole 203 to which a damper 40 is joined may be formed around the lower fastening hole 201. The lower damper seating part 203 has a lower damper insertion hole 204, such that a lower protrusion part 43 of the damper 40 is inserted into the lower damper insertion hole 204 to thereby fasten the damper 40. The lower fastening hole 201 has the same size as the central hole 41 of the damper 40 and the upper fastening hole 101 and is formed in the same position, such that the bush 50 can penetrate the upper fastening hole 101, the central hole 41 and the lower fastening hole 201.

It is preferable that the upper insulator 10 and the lower insulator 20 be symmetric with each other, but it is not necessarily so. It is also preferable that the damper 40 has a top and bottom symmetrical structure in such a manner that the upper protrusion part 42 and the lower protrusion part 43 are formed symmetrically, but it is not necessarily so.

As described above, at least three upper fastening parts 100 are formed on the upper inner circumference cover part 13 of the upper insulator 10, and preferably, they are formed symmetrically to each other. If the upper fastening part 100 is opposed to the lower fastening part 200 corresponding to the upper fastening part 100 and one bush 50 can be inserted into the upper fastening part 100 and the lower fastening part 200, there is no need for the upper fastening parts 100 to have the same shape, and the same applies to the lower fastening parts 200. In FIGS. 1 to 3, it is illustrated that the aligning hole 110 is formed in the upper fastening part 100, but it is not restricted to the above-mentioned form. For instance, the aligning hole 110 may be formed in the upper inner circumference cover part 13 without regard to the upper fastening part 100.

In a state where the upper insulator 10 and lower insulator 20 are fastened to each other, the upper inner circumference cover part 13 and the lower inner circumference cover part 14 do not come into contact with each other. Therefore, also the upper fastening part 100 and the lower fastening part 200 do not come into contact with each other in the state where the upper insulator 10 and lower insulator 20 are fastened to each other. The part where the upper fastening part 100 and the lower fastening part 200 do not come into contact with each other is an open part, and the core inner circumferential surface 33 of the stator core 30 is exposed to the outside through the open part. Through such a structure, the stator of the motor according to the preferred embodiment of the prevent invention can reduce an amount of required resin molding and prevent fine vibration and noise generated at the boundary part.

The stator core 30 is formed by the steel sheets laminated on top of each other, and in this instance, the steel sheets may be wound in a spiral form or may be stacked on top of each other on just one steel plate according to a laminating method.

As described above, while the present invention has been particularly shown and described with reference to the example embodiment thereof, it will be understood by those of ordinary skill in the art that the above embodiment of the present invention are all exemplified for your understanding and are not to limit the technical scope of the present invention. It should be also understood that the protective scope of the present invention is interpreted by the following claims and all technical ideas within the equivalent scope belong to the technical scope of the present invention.

The invention claimed is:

1. A stator of a motor for a washing machine comprising:
a stator core manufactured by a plurality of steel sheets laminated on top of each other, the stator core having a core base and a plurality of teeth radially formed on the core base;
an upper insulator which covers the upper parts of the core base and the teeth to insulate them, the upper insulator having least three upper fastening parts which are formed therein and each of which has an upper fastening hole;
a lower insulator which covers the lower parts of the core base and the teeth to insulate them, the lower insulator having least three lower fastening parts which are formed therein and each of which has a lower fastening hole; and
a damper which is joined between the upper fastening part and the lower fastening part and which has a central hole, wherein the upper fastening hole, the lower fastening hole and the central hole are formed at positions corresponding to one another,
wherein a predetermined space is formed between the inner circumferential surface of the upper insulator and the inner circumferential surface of the lower insulator, and the inner circumferential surface of the core base is exposed through the space.

2. The stator according to claim 1, wherein an upper damper seating part which has an upper damper insertion hole is formed inside the upper fastening hole, a lower damper seating part which has a lower damper insertion hole is formed inside the lower fastening hole, an upper protrusion part formed at the upper part of the damper is inserted into the upper damper insertion hole, and a lower protrusion part formed at the lower part of the damper is inserted into the lower damper insertion hole.

3. The stator according to claim 1, further comprising:
a bush which is fastened to the upper fastening hole, the central hole and the lower fastening hole.

4. The stator according to claim 1, wherein an upper strength reinforcing part is formed around the upper fastening part, and a lower strength reinforcing part is formed around the lower fastening part.

* * * * *